United States Patent [19]

Bugler, III

[11] Patent Number: 5,364,569
[45] Date of Patent: Nov. 15, 1994

[54] RELIEVED INLET STRUCTURE FOR COUNTERFLOW WATER COOLING TOWER

[75] Inventor: Thomas W. Bugler, III, Prairie Village, Kans.

[73] Assignee: The Marley Cooling Tower Company, Mission, Kans.

[21] Appl. No.: 108,901

[22] Filed: Aug. 18, 1993

Related U.S. Application Data

[63] Continuation of Ser. No. 847,377, Mar. 6, 1992, abandoned.

[51] Int. Cl.$^5$ .............................................. B01F 3/04
[52] U.S. Cl. ................................... 261/109; 261/112.2
[58] Field of Search ................... 261/109, 112.2, 111

[56] References Cited

U.S. PATENT DOCUMENTS

| | | | |
|---|---|---|---|
| 570,318 | 10/1896 | Loughridge | 261/109 |
| 753,573 | 3/1904 | Hettinger | 261/109 |
| 2,287,297 | 6/1942 | Dewey | 261/109 |
| 2,356,192 | 8/1944 | Yingling | 261/DIG. 11 |
| 2,394,755 | 2/1946 | DeFlon | 261/109 |
| 3,081,987 | 3/1963 | Meek et al. | 261/112.2 |
| 3,195,870 | 7/1965 | Gruber et al. | 261/DIG. 11 |
| 3,318,586 | 5/1967 | Meredith | 261/109 |
| 3,574,032 | 4/1971 | Norback et al. | 261/112.2 |
| 3,707,277 | 12/1972 | Phelps | 261/109 |
| 3,865,799 | 2/1975 | Katagiri et al. | 261/DIG. 11 |
| 3,917,764 | 11/1975 | Phelps | 261/112.2 |
| 4,052,491 | 10/1977 | Letevre | 261/112.2 |
| 4,157,368 | 6/1979 | Fernandes | 261/109 |

FOREIGN PATENT DOCUMENTS

| | | | |
|---|---|---|---|
| 572869 | 3/1933 | Germany | 261/DIG. 11 |
| 492540 | 9/1938 | United Kingdom | 261/DIG. 11 |
| 870485 | 6/1961 | United Kingdom | 261/DIG. 11 |
| 1033943 | 6/1966 | United Kingdom | 261/DIG. 11 |
| 718687 | 2/1980 | U.S.S.R. | 261/109 |

*Primary Examiner*—Tim Miles
*Attorney, Agent, or Firm*—Hovey, Williams, Timmons & Collins

[57] ABSTRACT

A counterflow cooling tower (10) is provided having specially designed inlets (14, 16) which minimize turbulence and air flow disruption at the inlet region of the tower (10), thereby increasing cooling efficiency. The tower (10) preferably includes a casing (12) presenting sidewalls (28, 30) each having a lower edge (14a, 16a) which defines the upper margins of the inlets (14, 16). The tower fill structure (20) presents, adjacent each inlet (14, 16) a relieved air entrance face (44, 46) which extends at an angle both downwardly and inwardly from the adjacent casing wall edge (14a, 16a); in addition, the fill structure (20) includes a generally horizontal bottom surface (48) inboard of and below the edges (14a, 16a). A substantially unrestricted, fill-free air flow zone (51) extends between the inlets (14, 16) and between the fill bottom surface (48) and the tower cold water collection basin (22). Comparative tests demonstrate that the inlet arrangement of the invention lowers turbulence and air flow disruption inboard of the inlets (14, 16).

6 Claims, 3 Drawing Sheets

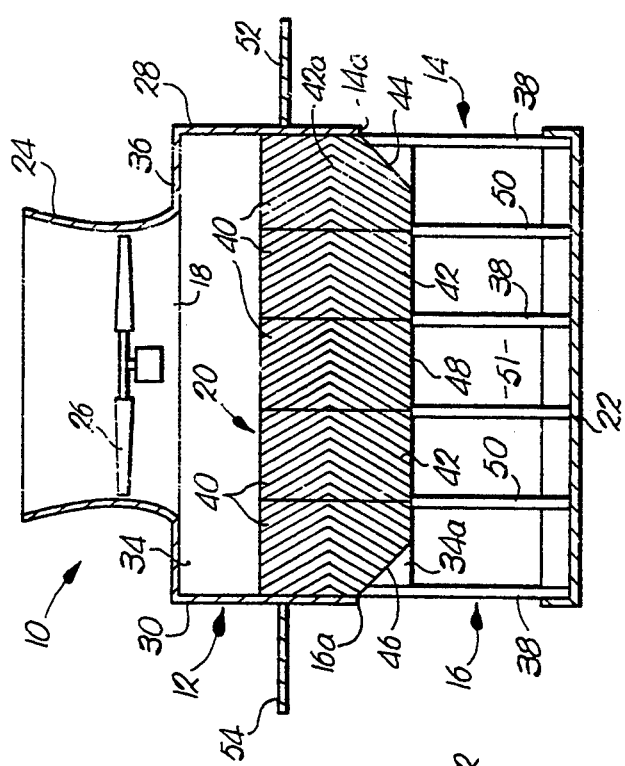
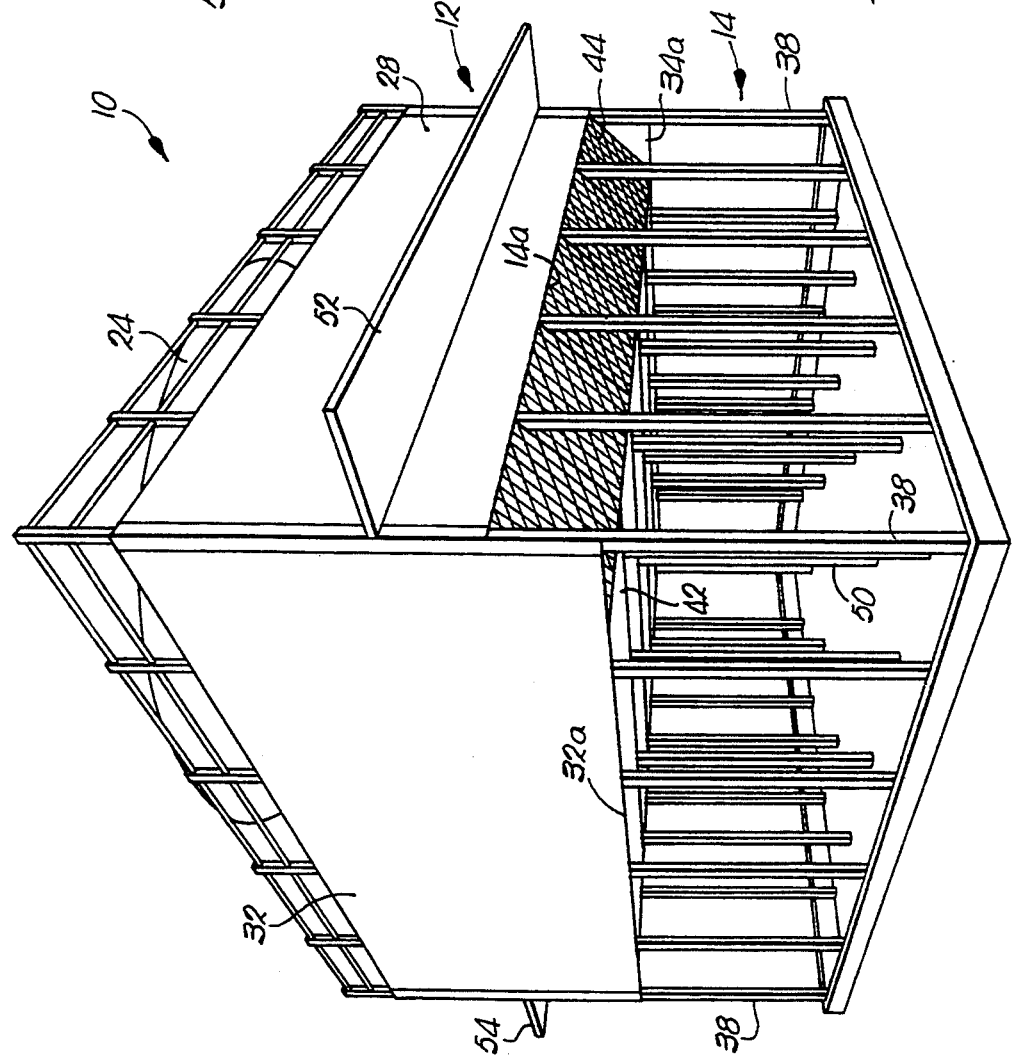

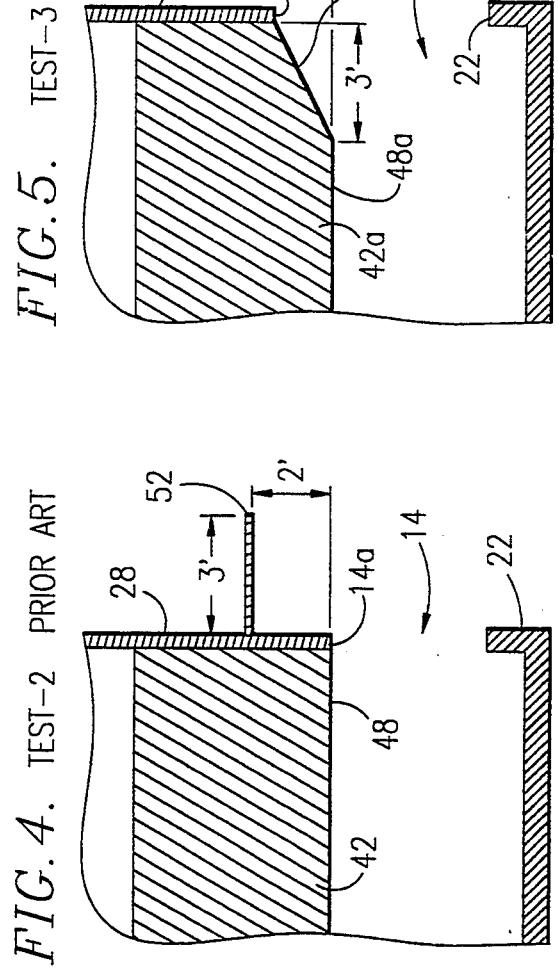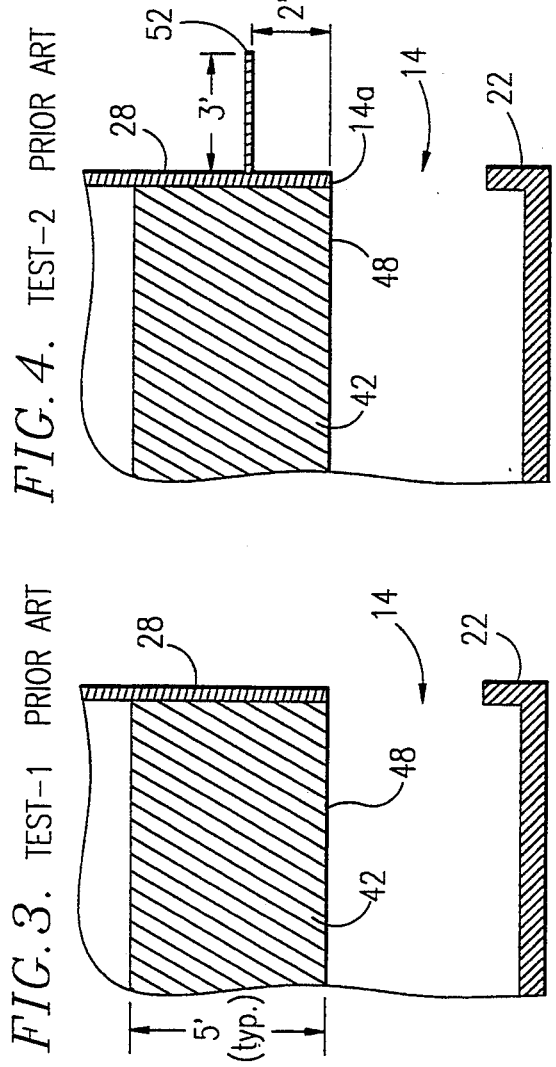

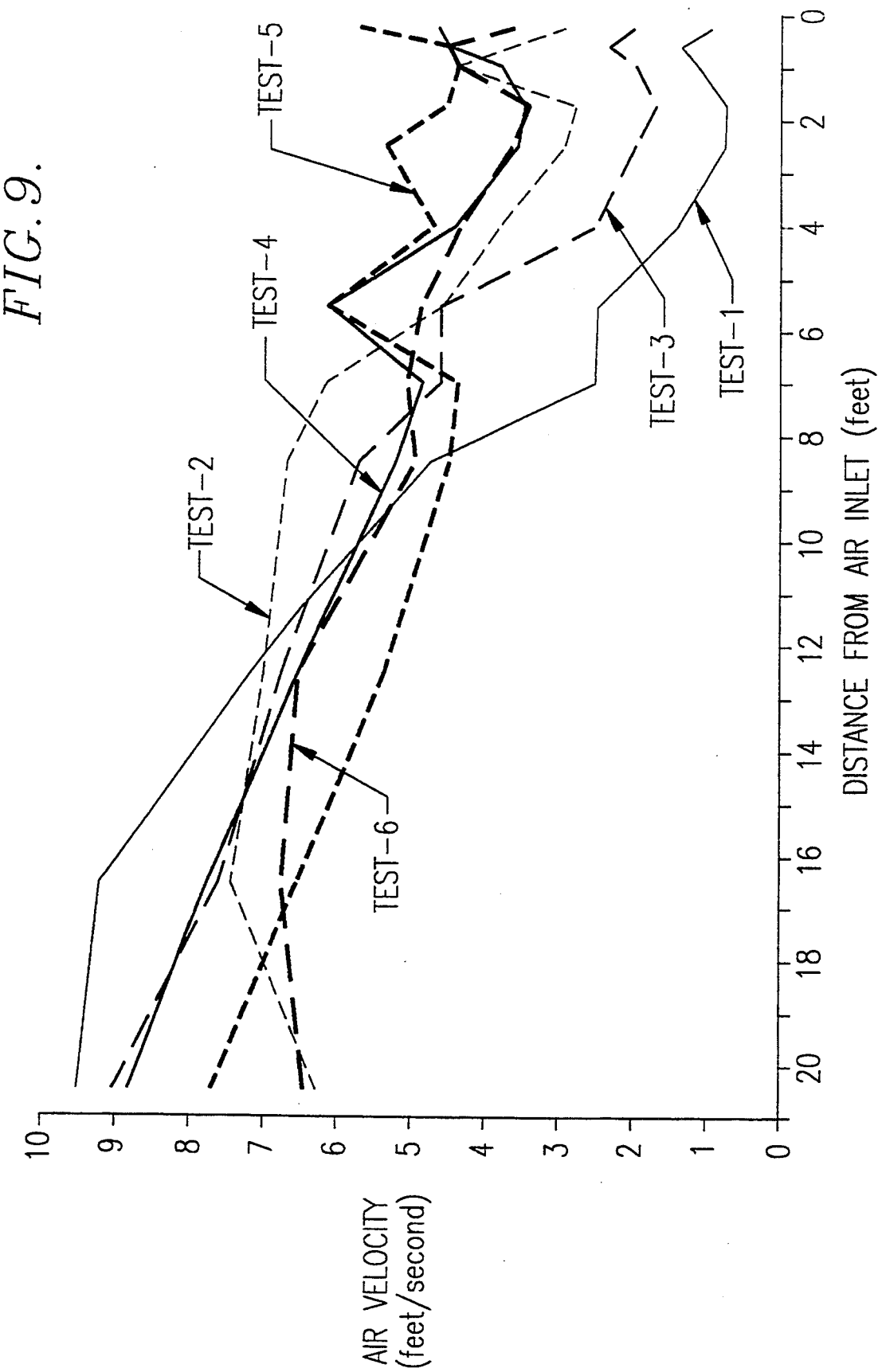

RELIEVED INLET STRUCTURE FOR COUNTERFLOW WATER COOLING TOWER

This is a continuation of application Ser. No. 07/847,377, filed on Mar. 6, 1992 now abandoned.

BACKGROUND OF THE INVENTION

1. Field of the Invention

The present invention is broadly concerned with an improved counterflow water cooling tower construction characterized by an eased inlet structure serving to minimize undesirable air turbulence at the air inlets of the tower, thereby increasing the overall cooling efficiency thereof. More particularly, it is concerned with such a counterflow tower wherein the fill structure (preferably cross-corrugated film-type) presents a lower side marginal air entrance surface which extends below and inwardly at an oblique angle from the edge of the upper inlet-defining wall surface of the tower casing, with the bottom of the fill structure being generally horizontal. In this way, the velocity of entering air is maximized, and even air flow is facilitated within the substantially unrestricted air flow zone between the underside of the fill and the lowermost cold water collection basin of the tower.

2. Description of the Prior Art

Counterflow water cooling towers broadly comprise an upright casing supporting an elevated water distribution system, an underlying water-dispersing fill, means such as powered fan(s) for drawing ambient-derived cooling air currents into the casing through appropriate inlets and upwardly through the tower casing and fill, and an underlying cold water collection basin. The distribution system serves to receive initially hot water and to distribute the same for gravitation through the underlying fill structure. The latter can be of the splash or film variety, but in all cases serves to effect a thermal interchange relationship between the initially hot water descending through the fill and the countercurrently upwardly flowing air currents.

A persistent problem with counterflow towers stems from the tendency of such towers to suffer from substantial air flow disruption and turbulence at the region of the lower air inlets thereof. This in turn creates uneven and/or deprived air flow through the fill structure, particularly at the outboard regions thereof immediately adjacent the tower casing. Such an air flow pattern detracts from the cooling efficiency of the tower, which is maximized where the air flow is substantially uniform.

A variety of counterflow air inlet designs have been proposed in the past, but all suffer from poor inlet flow distribution to a greater or lesser degree. For example, it is known to provide fill structure within the tower which extends to a point essentially flush with the upper defining edges of opposed air inlets, and is also known to provide outwardly extending fins or air entrance guides above the inlets. U.S. Pat. No. 4,873,028 describes an inlet/fill arrangement wherein the fill structure includes a plurality of side-by-side trapezoidal-shaped fill sheets which cooperatively present an oblique, non-horizontal air entrance face. The fill structure in this instance extends essentially the full height of the tower down to the collection basin. Similarly, U.S. Pat. No. 3,983,190 provides full-height fill structure presenting an oblique air entrance face, but here again the fill extends down to the collection basin and effectively blocks lateral air flow through the tower.

There is therefore a decided need in the art for an improved counterflow tower design which ameliorates the problems associated with air flow disruption at the inlets thereof and thereby enhances overall cooling efficiency.

SUMMARY OF THE INVENTION

The present invention overcomes the problems outlined above and provides a counterflow cooling tower having an upright casing presenting a pair of opposed wall surfaces with a lower air inlet through one such wall surface, as well as an upper air outlet. Means such as powered fan(s) or a hyperbolic stack may be employed for inducing initially cool, ambient-derived air currents through the tower inlet and upwardly through the casing for discharge through the outlet. Fill structure, preferably of the cross-corrugated film-type, are provided within the casing for causing thermal interchange between initially hot water descending through the fill and upwardly passing initially cool air currents.

The tower inlet is defined in part by an edge of one of the casing wall surfaces, and the fill structure is cooperatively designed so as to present a lower side marginal air entrance surface extending below and inwardly at an oblique angle from the one wall surface edge. In addition, the fill presents a generally horizontal bottom surface below and inboard of the inlet-defining casing wall edge.

The overall tower further includes a lower collection basin beneath the fill structure for collecting cooled air therefrom. Also, the tower design presents a substantially unrestricted air flow zone free of fill structure and extending between the opposed casing wall surfaces and also between the bottom surface of the fill structure and the collection basin.

In particularly preferred forms, the relieved air entrance face of the fill is oriented at an angle of from about 10°–60° relative to the bottom surface of the fill, and more preferably from about 15°–45°.

In further preferred forms, an outwardly extending fin or air entry guide may be positioned adjacent the air entrance inlet of the tower, and this has been shown to further ease the entry of air and facilitate desired laminar flow thereof.

Normally, the towers of the invention are polygonal in cross-section, presenting opposed, generally parallel walls. In such designs, a pair of opposed identical air inlets are normally provided in opposite sidewalls of the casing, and correspondingly the fill structure is designed to present a pair of relieved air entrance faces extending below the upper margins of the opposed inlets.

Actual test results have demonstrated that the air inlet and fill design of the present invention gives measurably increased air velocities at points closely adjacent the air inlet, establishing that air flow disruption is minimized.

BRIEF DESCRIPTION OF THE DRAWINGS

FIG. 1 is a perspective view of a counterflow cooling tower in accordance with the invention;

FIG. 2 is an essentially schematic vertical sectional view of the tower illustrated in FIG. 1;

FIGS. 3–4 are respectively fragmentary, schematic views depicting the air inlet and fill structure arrangements of two prior art counterflow towers;

FIGS. 5-8 are respectively fragmentary, schematic views depicting four individual embodiments of the present invention making use of fill structures having relieved, angularly oblique air entrance faces extending below the upper margins of the corresponding air inlets; and FIG. 9 is a graph illustrating a series of air velocity versus distance tests conducted using the structure depicted in FIGS. 3-8, and demonstrating that towers in accordance with the present invention yield reduced air flow disruption adjacent the air inlets thereof.

DESCRIPTION OF THE PREFERRED EMBODIMENTS

Turning now to the drawings, and particularly FIGS. 1-2, a counterflow cooling tower 10 in accordance with the invention. Broadly speaking, the tower 10 includes an upright polygonal casing 12 defining a pair of opposed air inlets 14, 16, as well as an air outlet 18. In addition, the tower has an internal fill structure 20 as well as an underlying cold water collection basin 22. A fan stack 24 and motor-driven fan 26 are situated atop casing 12 in communication with outlet 18, for the purpose of drawing ambient-derived air currents through the inlets 14, 16 and upwardly through fill structure 20 for discharge from the tower. Although not shown, the tower 10 is of course provided with conventional means above fill structure 20 for receipt and distribution of initially hot water, so that such water may gravitate through the fill structure 20 in counterflowing, intercepting relationship with the upflowing air currents.

In more detail, the casing 12 includes a pair of opposed sidewalls 28, 30 as well as end walls 32, 34. An apertured top wall 36 completes the basic casing and has outlet opening 18 therethrough. The casing walls 28-36 are supported by a series of outboard columns 38 which extend upwardly from the region of basin 22 and are connected to the described walls.

Each of the inlets 14, 16 is defined at the upper end thereof by an elongated marginal edge 14a or 16a, which is effectively the lower edge of the corresponding sidewall 28 or 30. The lower ends of the inlets 14, 16 are effectively defined by the upper margins of the basin 22, as best seen in FIG. 2. Finally, it will be seen that the inlets extend the full length of the sidewalls 28, 30. Secondary air inlets are also provided in the end walls 32, 34, but in this instance the lower margins 32a, 34a are below the edges 14a, 16a. In this respect, it will be understood that the secondary air inlets can also be provided with the relieved fill pack arrangement of the inlets 14, 16. However, in most commercial installations, a series of the towers 10 will be placed in end-to-end adjacency as respective cells, and in such cases, the need to provide relieved fill at the end walls is minimized.

Fill structure 20 in preferred forms is made up of multiplicity of side-by-side fill packs 40 of cross-corrugated film-type fill, particularly of the variety described in U.S. Pat. No. 3,450,390 which is incorporated by reference herein. As is evident from the '390 patent, each of the packs 40 has a series of parallel upright sheets 42 having angular corrugations which extend first one direction and then the next direction as is evident from FIG. 2 of the drawings herein. In addition, directly opposed corrugations of adjacent sheets are inclined in opposite directions to present a cross corrugated pattern. Although packs 40 are depicted in FIG. 2 as extending the full height of fill structure 20, it is to be understood that fill structure 20 may be comprised of a plurality of horizontally extending, individual fill packs in vertically stacked relationship with the zone of merger of adjacent packs being the region where the direction of the corrugation changes, i.e., imaginary horizontal line 42a indicated in FIG. 2.

The lowermost section of fill structure 20 is relieved at the region of each sidewall 28, 30 as shown. Specifically, the fill structure 20 presents a pair of lower side marginal air entrance surfaces 44, 46 respectively extending both downwardly and inwardly from an associated inlet-defining edge 14a or 16a. The fill structure 20 further presents a generally horizontal bottom surface 48 which is located both below and inboard of the edges 14a, 16a. The entire fill structure 20 is supported by a series of inner, upright columns 50 extending upwardly from basin 22, the columns 50 carrying girts or similar expedients for directly contacting and supporting the fill structure 20.

The position of fill structure 20 above basin 22 serves to create a substantially unrestricted air flow zone 51 which is free of fill structure and extends laterally between the inlets 14, 16 and vertically between fill bottom 48 and casing 22.

The inlet structure of the preferred embodiment is completed by provision of a pair of elongated air entry guides 52, 54 respectively secured to a casing sidewall 28 or 30 and extending outwardly therefrom in a substantially horizontal fashion. Note in this respect that the guides 52, 54 are positioned above and in overlying relationship to the edges 14a, 16a.

The basin 22 is entirely conventional and simply serves as a convenient means of collecting cold water gravitating from the overlying fill structure 20. Typically, means is also provided for conveying the cold water away from the tower 10; again, such designs are well within the skill of the art.

Attention is next directed to FIGS. 5-8 which illustrate various embodiments in accordance with the invention. In the case of FIG. 5, the lower fill pack 42a presents a downwardly and inwardly extending, relieved, air entrance surface 56. The vertical height of the face 56 is about 1.5 feet, whereas the horizontal face thereof, i.e., the distance between the edge 14a and outboard rim of the bottom surface 48a of the pack is about 3 feet. Accordingly, the preferred ratio of these distances is about 0.5 (1.5/3). More broadly, however, this ratio should range from about 0.15 to about 1.75.

FIG. 6 is similar in many respects to that of FIG. 5 but depicts the use of a guide 52, and shows the most preferred dimensional relationships between the width of the guide (3 feet) and the vertical distance between the guide and inlet-defining edge 14a (2 feet). Accordingly, the dimensional relationships and ratios of FIG. 5 also remain in the FIG. 6 embodiment. However, it will be seen that the ratio of the vertical height of the lower side marginal air entrance surface 56 to the vertical distance between the edge 14a and guide 52 is about 0.75 (1.5/2); more broadly, this ratio is from about 0.5 to about 1. Finally, it will be observed that the ratio of the width of the guide 52 to the horizontal dimension of the face 56 is about 1 (3/3), and that in a broader sense this ratio should be from about 0.5 to about 3.

FIGS. 7 and 8 are again similar to the embodiments depicted in FIGS. 5 and 6. However, these two figures illustrate a pair of preferred angles of orientation of the lower side marginal air entrance surfaces 56a (FIG. 7) and 56b (FIG. 8). As noted above, this angle should broadly range from about 10°–60°, and more preferably from about 15°–45°. The preferred dimensional relationships described previously are also applicable to these embodiments.

In the operation of counterflow cooling towers in accordance with the invention, and with particular reference to exemplary tower 10, initially hot water is delivered to the top of the tower above fill structure 20 and is dispersed by conventional means for gravitation through the fill. At the same time, rotation of fan 26 induces ambient-derived air currents to pass through the inlets 14, 16, as well as through the secondary inlets where appropriate, so that such currents pass upwardly through the fill in counterflow relationship to the descending hot water. In the fill structure, the water and air are caused to intersect and thermally interchange so as to cool the water. Hot, moist water from the fill is withdrawn and discharged through outlet 18 and stack 24. The cooled water on the other hand gravitates through the fill structure and is collected in cold water basin 22.

During such water cooling operations, the inlet arrangement of the tower 10 serves to minimize turbulence and air flow disruption, particularly just inboard of the casing sidewalls 28, 30.

It has been found that the relieved inlet effect of this design gives substantially greater air velocities just inboard of the inlets 14, 16, as compared with prior art designs. FIG. 9 is a graphical representation setting forth the results of a series of comparative tests wherein conventional counterflow towers of the type illustrated in FIGS. 3–4 were compared with the designs of the present invention (FIGS. 5–8). The respective FIGS. 3–8 correspond to tests 1–6 respectively. As shown in the graph, test 1 (FIG. 3) involving a standard fill/inlet construction without an air inlet guide, shows a substantially lower air velocity just inboard of the inlet, as compared with test 3 (FIG. 5), which is in accordance with the present invention but which likewise does not include an air inlet guide. Similarly, the prior art test 2 (FIG. 4) design is a conventional tower wherein the inlet is provided with an entry guide; this test should be compared with test 4, corresponding to the FIG. 6 construction. Here again, the test 4 results are superior to those of test 2 in the critical area inboard of the inlet. Finally, the results of tests 5–6 are likewise superior to the test 2 prior art design wherein use is made of an entry guide.

I claim:

1. A counterflow water cooling tower comprising:
    a generally horizontal cold water collection basin;
    an upright casing above the collection basin and including an upper horizontal wall provided with an air outlet, and a plurality of upstanding walls, at least one of which includes a lower edge that is vertically spaced from the collection basin to define an air inlet;
    a means for inducing inflow of initially cool, ambient-derived air currents through said air inlet and upwardly through said casing for discharge through said air outlet;
    a fill structure supported within the upright casing above the collection basin and including a plurality of fill packs each formed of a series of parallel upright film-type fill sheets of similar shape and size so that each fill pack is of rectangular parallelepiped shape, the fill packs being arranged side-by-side to present a generally planer upper surface above the air inlet and adjacent the air outlet, and an opposed generally planer lower surface disposed beneath the lower edge defining the air inlet and overlying the collection basin, the fill sheets extending vertically between the upper and lower surfaces;
    wherein at least one of the fill packs is an edge region pack supported against the upstanding wall in which the air inlet is provided, the edge region pack including a lower edge region that is relieved to present an angled marginal air entrance surface extending both downward and inward from the lower edge toward the planer lower surface of the edge region pack, the marginal air entrance surface being angled from the planer lower surface of the edge region pack by between about 15° to 45°.

2. The tower of claim 1, wherein the marginal air entrance surface is angled from the planer lower surface of the edge region pack by about 45°.

3. The tower of claim 1, including an elongated, outwardly extending air inlet guide secured to said casing above said one wall surface edge.

4. The tower of claim 3, said air inlet guide presenting a width between said casing and the outboard margin of the air inlet guide, said air inlet guide width being greater than the vertical distance between said air inlet guide and said one wall surface edge.

5. The tower of claim 3, wherein the ratio of the vertical height of said lower side marginal air entrance surface between said one wall surface edge and bottom surface to the vertical distance between said air inlet guide and one wall surface edge being from about 0.5 to about 1.

6. The tower of claim 5, wherein said ratio is about 0.75.

* * * * *